United States Patent [19]
Leon

[11] Patent Number: 5,955,679
[45] Date of Patent: Sep. 21, 1999

[54] DEVICE FOR MEASURING STRAIN PARAMETERS OF A GENERALLY CYLINDRICAL MEMBER OF VIRTUALLY ANY SIZE

[75] Inventor: Robert L. Leon, Maple Glen, Pa.

[73] Assignee: Liberty Technologies, Inc., Conshohocken, Pa.

[21] Appl. No.: 09/008,747

[22] Filed: Jan. 19, 1998

Related U.S. Application Data

[60] Provisional application No. 60/036,855, Jan. 31, 1997.

[51] Int. Cl.[6] .................................................... G01B 7/16
[52] U.S. Cl. ................................ 73/775; 73/774; 73/831
[58] Field of Search ............................. 73/763, 831, 765, 73/774, 795, 775

[56] References Cited

U.S. PATENT DOCUMENTS

| | | |
|---|---|---|
| 2,568,940 | 9/1951 | Wolf . |
| 3,745,448 | 7/1973 | Hiratsuka et al. ..................... 73/765 |
| 3,930,918 | 1/1976 | Cernik .................................. 73/765 |
| 3,973,293 | 8/1976 | Noorily . |
| 4,023,402 | 5/1977 | Watanabe . |
| 4,092,765 | 6/1978 | Joyce . |
| 4,141,349 | 2/1979 | Ory et al. ............................. 73/765 |
| 4,411,159 | 10/1983 | Spear et al. .......................... 73/768 |
| 4,791,816 | 12/1988 | Grare et al. . |
| 5,535,631 | 7/1996 | Paine . |
| 5,712,430 | 1/1998 | Meyer ................................... 73/831 |

*Primary Examiner*—Max Noori
*Attorney, Agent, or Firm*—Panitch Schwarze Jacobs & Nadel, P.C.

[57] ABSTRACT

A device for measuring strain parameters of a stem, shaft or other cylindrical member of virtually any size or diameter includes a pair of generally flexible holders, each holder supporting a substrate having at least one strain gage thereon. Each substrate is bonded in a predetermined aligned position on the cylindrical member relative to the other substrate to permit strain measurement of the cylindrical member. The holders each include at least one guide. A flexible tensioning band engages the guide on each of the holders for placement and retention of the substrates in the predetermined positions. The band is tightened to provide pressure on the substrates during bonding for proper bonding of the substrates to the cylindrical member to provide adequate transfer of strain. In an alternate embodiment a single holder having a single strain gage substrate thereon is employed.

16 Claims, 4 Drawing Sheets

PRIOR-ART

DEVICE FOR MEASURING STRAIN PARAMETERS OF A GENERALLY CYLINDRICAL MEMBER OF VIRTUALLY ANY SIZE

CROSS-REFERENCE TO RELATED APPLICATIONS

Priority is claimed from U.S. Provisional Patent Application No. 60/036,855, filed Jan. 31, 1997 and entitled "An Opposing Stem Strain Gage Device For Any Size Stem Or Shaft".

BACKGROUND OF THE INVENTION

The present invention relates generally to a device for measuring strain parameters of a generally cylindrical member and, more particularly, to such a device which is adapted for measuring such parameters in a generally cylindrical member of virtually any size.

Engineers and technicians often need to secure one or more strain gages to a valve stem, drive shaft or other generally cylindrical member for the purpose of measuring axial and/or circumferential strain for ascertaining axial force, as well as to measure torsional strain for ascertaining torque on the member. If bending of the cylindrical member could be occurring while measuring the axial strain, strain gage elements must be affixed to opposite sides of the cylindrical member in order to cancel out any such bending effects. Having all of the necessary strain gage elements located on a single supporting grid prior to bonding to the cylindrical member is desirable for proper positioning of the strain gage elements on opposite sides and for proper alignment of the strain gage elements themselves. However, the use of a single supporting grid for all of the strain gage elements generally means that a different size grid must be fabricated to accommodate each of the various sizes of the cylindrical members for which strain parameters may be measured. The use of such multiple size grids can be bothersome and very costly from a production and stocking standpoint when cylindrical members of many different diameters may have to be strain gaged.

The present invention overcomes the requirement of having to use a different size supporting grid for measuring strain parameters of each different diameter stem, shaft or other cylindrical member, while still retaining the important strain gage alignment features available when using a single supporting grid. The desired result is accomplished by effectively separating the supporting grid into two individual parts, called holders, with each holder having its own properly aligned strain gage elements and by utilizing a precisely fitting tensioning band to assure precise alignment between the two holders on the cylindrical member. The tensioning band also provides a way of securely clamping each strain gage substrate to the stem, shaft, or other cylindrical member during the gage affixing process. Preferably, electrical connections between the gage elements of the two holders are prewired to a standard connector as part of an assembly so that contact resistance does not adversely effect performance.

BRIEF SUMMARY OF THE INVENTION

Briefly stated, the present invention comprises a device for measuring strain parameters of a generally cylindrical member of virtually any size. The device comprises at least one, but preferably a pair of generally flexible holders, each holder supporting a substrate having at least one strain gage thereon. Each substrate is bonded in a predetermined aligned position on the cylindrical member and relative to the other substrate to permit strain measurement of the cylindrical member. The holders each include at least one guide. A flexible tensioning band engages the guide on each of the holders for placement and retention of the substrates in the predetermined positions. The band is tightened to provide pressure on the substrates at least during bonding for proper bonding of the substrates to the cylindrical member to provide adequate transfer of strain from the cylindrical member to the strain gages.

BRIEF DESCRIPTION OF THE SEVERAL VIEWS OF THE DRAWINGS

The foregoing summary, as well as the following detailed description of preferred embodiments of the present invention, will be better understood when read in conjunction with the appended drawings. For the purpose of illustrating the invention, there is shown in the drawings preferred embodiments. It should be understood, however, that the invention is not limited to the precise arrangements and instrumentalities as shown. In the drawings.

DETAILED DESCRIPTION OF THE INVENTION

Figure 1:
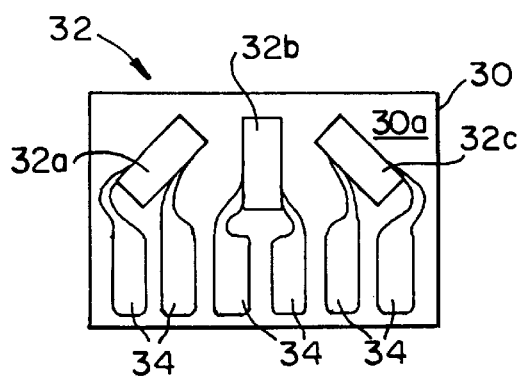
FIG. 1 is a front elevational view of a typical strain gage substrate with strain gages thereon.
Figure 2:
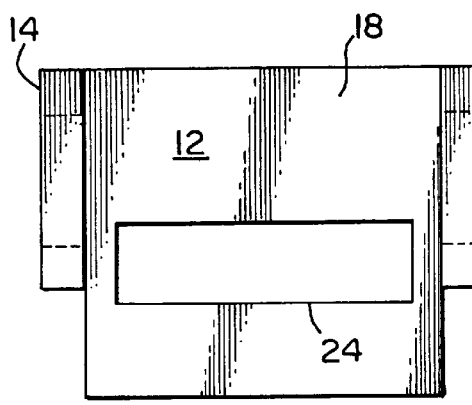
FIG. 2 is a front elevational view of a flexible holder in accordance with a preferred embodiment of the present invention.
Figure 3:
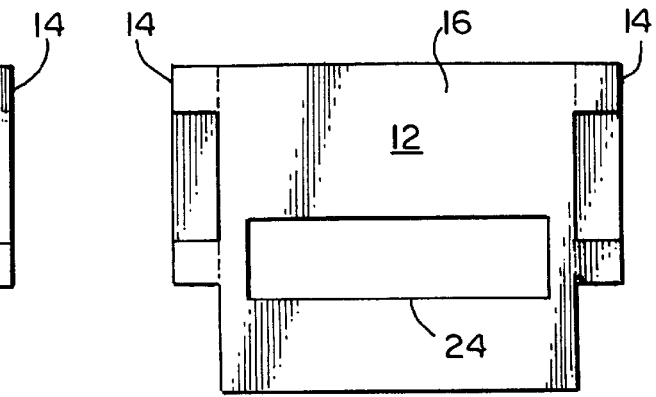
FIG. 3 is a rear elevational view of the holder of FIG. 2.
Figure 4:
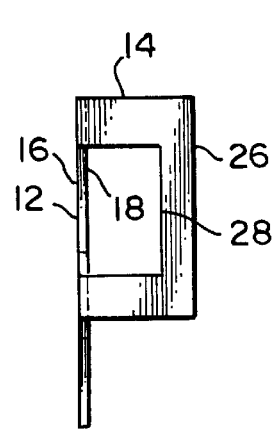
FIG. 4 is a left side elevational view of the holder of FIG. 2.
Figure 5:
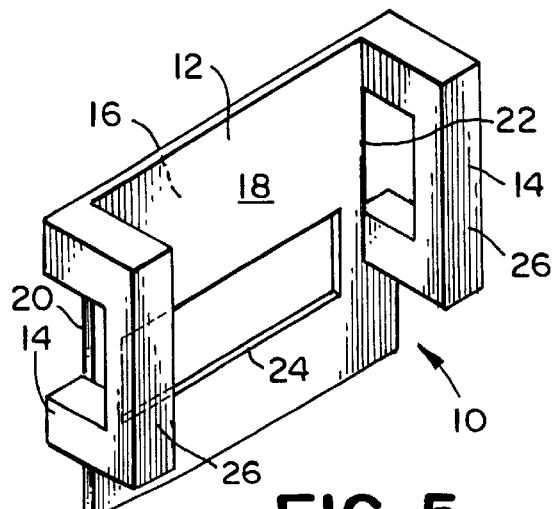
FIG. 5 is a front perspective view of the holder of FIG. 2.

Referring to the drawings, wherein the same referenced numerals are used with respect to the same elements throughout the several figures, there is shown in FIGS. 2–5 several views of a preferred embodiment of a generally flexible holder 10 in accordance with a preferred embodiment of the present invention. The holder 10 is comprised of a base portion 12 and at least one but preferably two guides 14. The base portion 12 is generally rectangularly shaped but could be square, oval shaped or of virtually any other shape suitable for performing the functions hereinafter described. As shown, the base portion 12 is very thin, having a preferred thickness in the range of 10–20 mils and includes first and second oppositely disposed principal or major surfaces 16, 18 and first and second opposite ends 20 and 22. A generally rectangularly shaped opening 24 extends completely through the base portion 12 from the first major surface 16 to the second major surface 18. The opening 24 is spaced a predetermined distance from each of the first and second ends 20, 22 and is spaced from the lateral sides of the base portion 12.

The guides 14 are preferably located on the second major surface 18 of the base portion 12 with one guide being located proximate to each of the first and second ends 20, 22. In the presently preferred embodiment, each guide 14 is comprised of a generally U-shaped member 26 which extends outwardly from the second major surface 18 of the base portion 12 to establish a generally rectangularly shaped slot or opening 28. The openings 28 are aligned with each other on the base portion 12 and are of the same predetermined size and shape.

Preferably, the holder 10 is made of a flexible material, more preferably a flexible molded polymeric material such as nylon. It will, of course, be apparent to those of ordinary skill in the art that the holder 10 could be formed of any other suitable flexible material such as aluminum or some other metal alloy, a fabric, paper based material, composite material or the like and that the holder 10 could be formed in some manner other than by molding. In addition, the shape and thickness of the holder 10 as shown and described may vary for particular applications. In the preferred embodiment, two such flexible holders 10 are provided on opposite sides of a cylindrical member in a manner which will hereinafter be described. It will also be appreciated by those skilled in the art that the guides 14 may be formed in some other manner such as by providing a pair of spaced lugs or bumps on each end of the second surface 18 of the holder 10 or that a single elongated guide 14 could be provided for each holder.

Each flexible holder 10 is employed for the purpose of supporting a precision strain gaged substrate 30 (FIG. 1) which in turn contains one or more strain gages thereon in a predetermined pattern. In the present embodiment, the substrate 30 is generally rectangularly shaped, and is preferably about the same size as the base portion 12 of the holder 10. In the present embodiment, the substrate 30 is very thin, having a thickness in the range of 2 mils and is made of a material which provides for good transfer of strain between the cylindrical member having the strain parameters being measured and the strain gages. In the presently preferred embodiment, the substrate 30 is made of a beryllium copper (BeCu) alloy although any other suitable metal, metal alloy or other material may alternatively be employed. If the substrate material is electronically conductive, the strain gages must be electrically isolated from the substrate which is typically accomplished by a backing on the strain gages.

As best shown in FIG. 1, in the present embodiment, the substrate 30 contains a predetermined gage element pattern 32 thereon. In the illustrated gage element pattern 32, the two outer gage elements 32a and 32c are intended for use as adjacent arms of a full active arm torque bridge while the center gage element 32c is intended to serve as one arm of a half active arm thrust bridge. Solder tabs or connector pads 34 extend from each gage element 32a, 32b, 32c toward a common edge of the substrate 30 on the same principal surface 30a of the substrate upon which the gage elements 32 are located. The opposite principal surface 30b of the substrate is adapted for being bonded directly to a cylindrical member for which strain parameters are to be measured as is well known in the art. The gage elements 32 are available from the Micro-Measurements Division of Measurements Group, Inc. located in Raleigh, N.C. Further details regarding the structure and operation of the gage elements 32 are not necessary for a complete understanding of the present invention but are available from the manufacturer. It will be appreciated by those of ordinary skill in the art that while the present embodiment employs a particular strain gaged substrate 30 with a particular number and arrangement of gage elements 32 and soldered tabs 34, the present invention should not be considered to be limited to a particular strain gaged substrate, a particular gage pattern, a particular number of gage elements or a particular number of soldered tabs. Instead, the present invention is applicable with respect to other substrates, other gage elements, other gage arrangements, etc.

Figure 6:
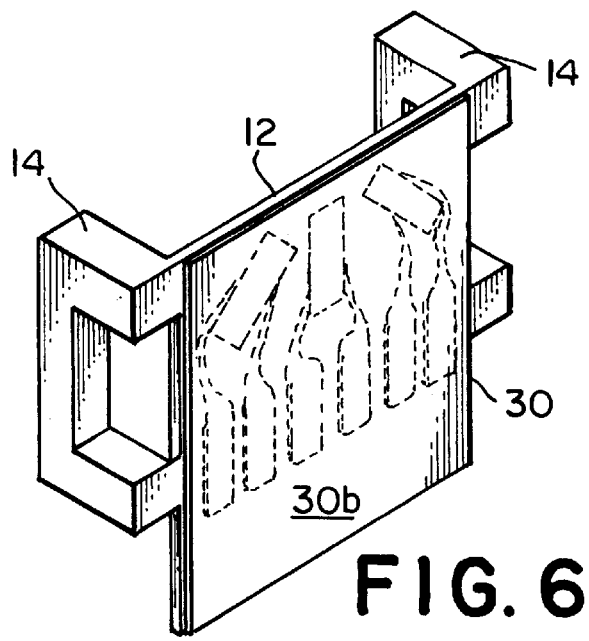
FIG. 6 is a rear perspective view of the holder of FIG. 2 with the strain gage substrate of FIG. 1 secured thereto.
Figure 7:
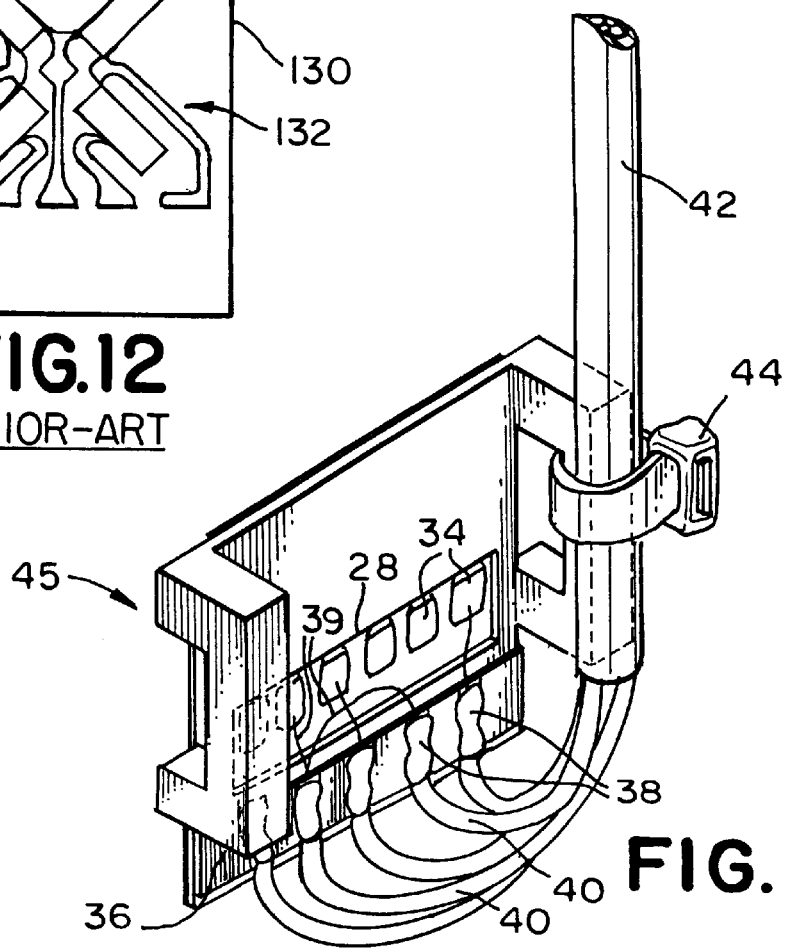
FIG. 7 is a front perspective view of the holder of FIG. 2 with the strain gage substrate of FIG. 1 and the requisite wiring attached.

As best shown in FIGS. 6 and 7, the substrate 30 is bonded on its gage surface 30a to the first principal surface 16 of the base portion 12 of the holder 10. Preferably, the edges of the substrate 30 are precisely aligned with the edges of the base portion 12 of the holder 10 so that the solder tabs 34 are aligned with the opening 28 of the base portion 12. Preferably, the strain gage substrate 30 is bonded to the holder 10 utilizing M-Bond 600 or other suitable adhesive or bonding agent. In this manner, the strain gage substrate 30 and the holder 10 are formed as an integral unit with the second primary surface 30b of the substrate 30 being exposed to facilitate bonding to a cylindrical member.

A terminal strip 36 is secured to the second major surface 18 of the base portion 12 of the holder proximate to the opening 28. The terminal strip 36 includes 5 terminals 38 each of which are generally aligned with the solder tabs 34 of the strain gage substrate 30. Fine copper wires 39 are secured, such as by soldering, between each of the solder tabs 34 and a respective terminal 38 on the terminal strip 36 in a manner best illustrated in FIG. 8. Heavier gaged lead wires 40 are also soldered or otherwise secured to each of the terminals 38 of the terminal strip 36, and are thereafter secured together with a surrounding sheath to form a cable 42. Preferably, the cable 42 is removably secured to the holder 10, preferably to one of the U-shaped members 26 to provide stress relief. A small cable tie device 44 or other suitable securing means may be employed for this purpose. The assembled device shown in FIG. 7 and as described above results in a strain gage assembly 45.

Figure 8:
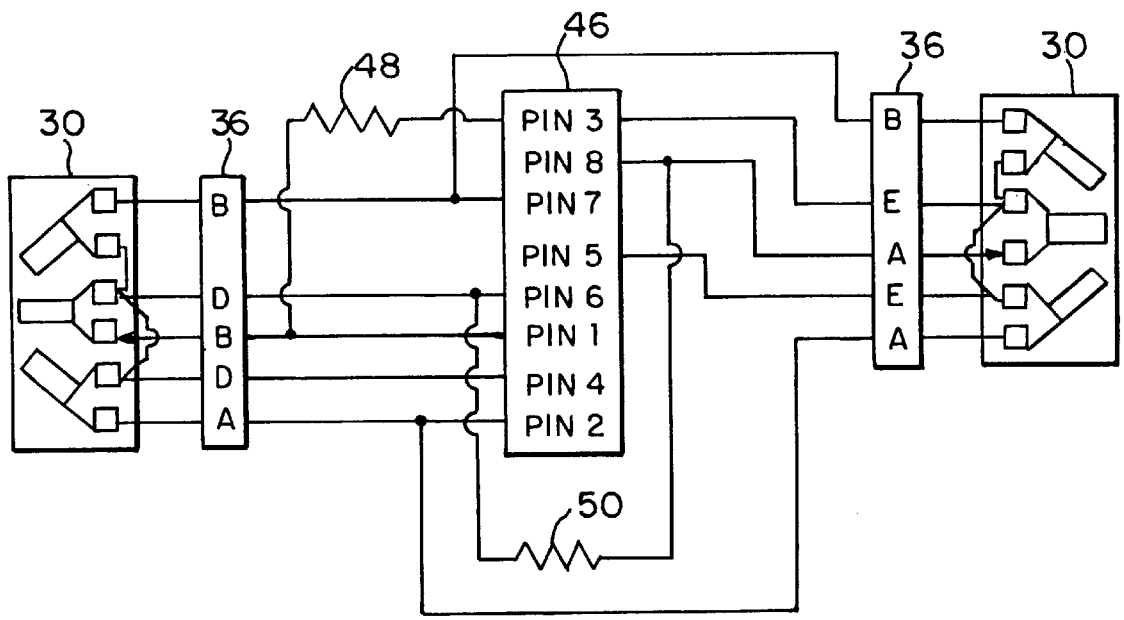
FIG. 8 is a schematic block diagram of the manner in which two strain gage assemblies are wired in accordance with a preferred embodiment of the present invention.

As discussed above, in many applications it is preferable to use two aligned strain gage assemblies 45 on opposite sides of a cylindrical member having strain parameters to be measured in order to cancel out any effects of bending and to thereby provide a more accurate reading of the desired strain parameters. Accordingly, with the present embodiment, a pair of strain gage assemblies 45, each including a flexible holder 10 having a substrate 30 including the respective gage elements 32 secured thereto and each having a respective cable 42 extending from the holder 10 are employed. Allowing sufficient slack to permit the two strain gage assemblies 45 to be properly aligned and positioned on opposite sides of a cylindrical member of virtually any size or diameter, the two cables 42 are joined together by suitable joining means such as a plurality of spaced cable tie devices 44 (see FIG. 9) in a manner well known to those of ordinary skill in the art. The distal ends of each of the cables 42 are terminated in a standard eight pin Molex connector 46 which is also of a type well known in the art. FIG. 8 is an electrical block diagram schematic of the manner in which the various strain gage elements 32 on each of the substrates 30 are electrically connected to the eight pins of the Molex connector. The resistors 48 and 50 in the schematic are dummy bridge completion resistors required for the half active arm thrust bridge formed in the presently preferred embodiment of the invention. The use of circuitry of the type illustrated in FIG. 8 is well known to those of ordinary skill in the art and a further discussion of the structure and functioning of the circuitry is not necessary for a complete understanding of the present invention. Further details concerning the circuitry shown in FIG. 8 are available from various strain gage manufacturers.

A key feature of the present invention is the use of a flexible tensioning band 52 to facilitate placement and retention of the holders 10 and the strain gaged substrates 30 in the requisite predetermined aligned positions on the cylindrical member for which the strain parameters are to be measured. In the present embodiment, the flexible tensioning band 52 is comprised of a large tie wrap of the type well known to those of ordinary skill in the art and which is typically employed for securing together a plurality of wires or other elongated elements. Such tie wraps are well known to those of ordinary skill in the art and are generally formed of a polymeric material such as nylon. Such tie wraps typically include an elongated body portion having a plurality of teeth along at least one surface and a slightly enlarged head portion having a slot-like opening extending therethrough, and including a one-way detente member within the slot for engaging the teeth on the body portion. Typically, such tie wraps are wrapped around wires or other elements to be secured together and the distal end of the body member is inserted into the slot in the head member such that the teeth engage the detente member. The distal end of the body portion is then pulled through the slot to tighten the body member around the members to be secured together. Tie wraps of the type described above are further described in U.S. Pat. Nos. 3,973,293 and 4,092,765 which are incorporated herein by reference. Such tie wraps are well known to those of ordinary skill in the art and available from a variety of manufacturers. Further details concerning the structure and operation of such tie wraps are not necessary for a complete understanding the present invention and are available in the above-cited patents. It will be appreciated by those of ordinary skill in the art that while in the presently preferred embodiment, a large tie wrap is employed for placement and retention of the holders 10 on the cylindrical member, any other type of tensioning band made of any other suitable material may alternatively be employed. For example, a metal tensioning band of the type employed in securing a vehicle radiator hose may alternatively be employed. Flexible tensioning bands of metal or metal alloys, composite materials, leather, fabric, or the like may alternatively be employed.

Figure 9:
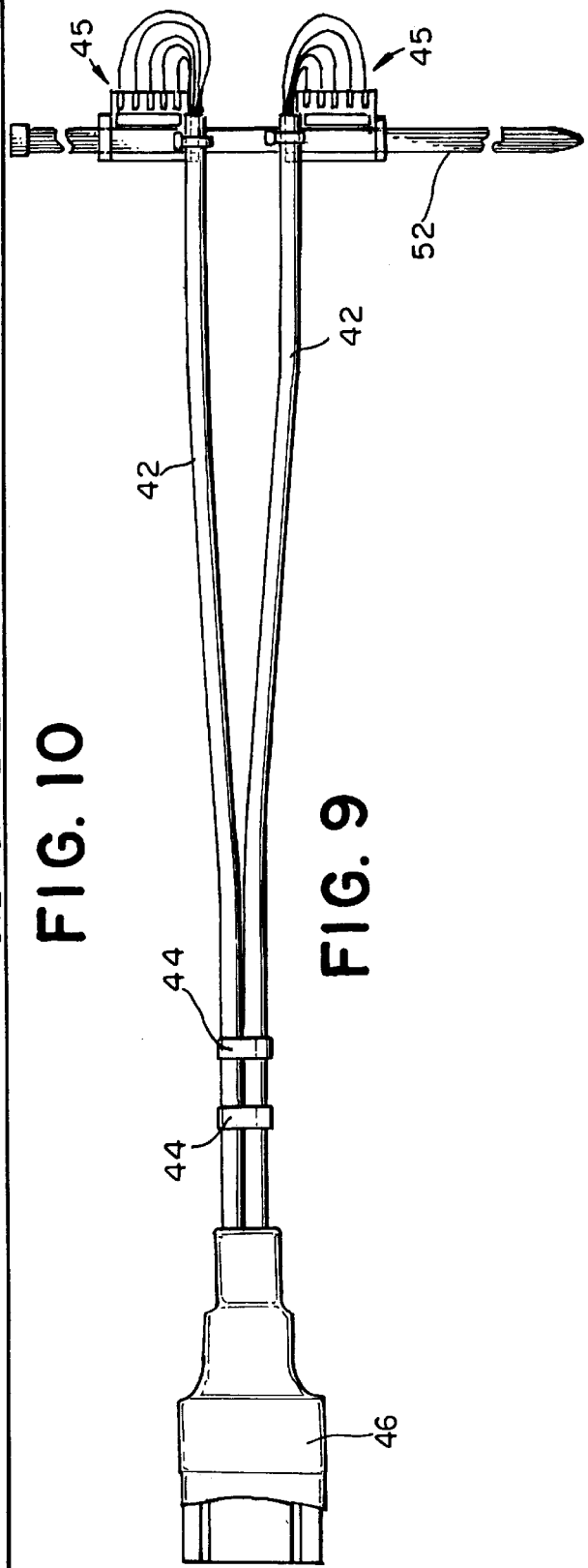
FIG. 9 is a front elevational view of a pair of strain gage assemblies wired to a common connector.

As best shown in FIG. 9, the tie wrap 52 is inserted through the openings 28 formed by the U-shaped members 26 on each of the holders 10. Preferably, the size and particularly the width of each guide opening 28 is just slightly greater than the size of the tie wrap 52 in order to provide a very tight fit for reasons which will hereinafter become apparent. Typically, the clearance between the outer dimensions of the tie wrap 52 and the inner dimensions of the guide opening 28 should be on the order of one mil to facilitate the very precise alignment of the holders 10 required for accurate measurement of strain parameters within a cylindrical member.

As discussed in greater detail below, the tie wrap 52 is employed to facilitate proper alignment and positioning of the holders 10 and the strain gage substrates 30 in precise predetermined positions relative to each other on the cylindrical member and to retain the holders 10 and the substrates 30 in the predetermined positions during bonding of the substrates 30 to the cylindrical member. As discussed above, with the present invention, it is possible to employ the same strain gage assemblies on a cylindrical member of virtually any size or diameter. All that is necessary is for the holders 10 and thus the strain gage substrates 30 to be bonded in the precisely determined aligned position necessary for proper strain gage measurement. Typically, a tie wrap or other flexible tensioning band 52 having a length sufficient to extend slightly more than completely around the outer dimension of the cylindrical member is all that is required to facilitate proper alignment and retention of the holders 10. It should be appreciated by those of ordinary skill in the art that if a tie wrap or tensioning band 52 of a sufficient length is not available, two or more tie wraps or other tensioning bands 52 may be secured together end to end in a manner well known to those of ordinary skill in the art to provide the necessary length. It will also be appreciated by those of ordinary skill in the art that while the present invention is typically employed in connection with a generally cylindrical shaft or member which is generally circular in cross section, the present invention is equally applicable to cylindrical members having other cross sectional shapes (such as oval, hexagonal, octagonal, etc.).

Figure 10:
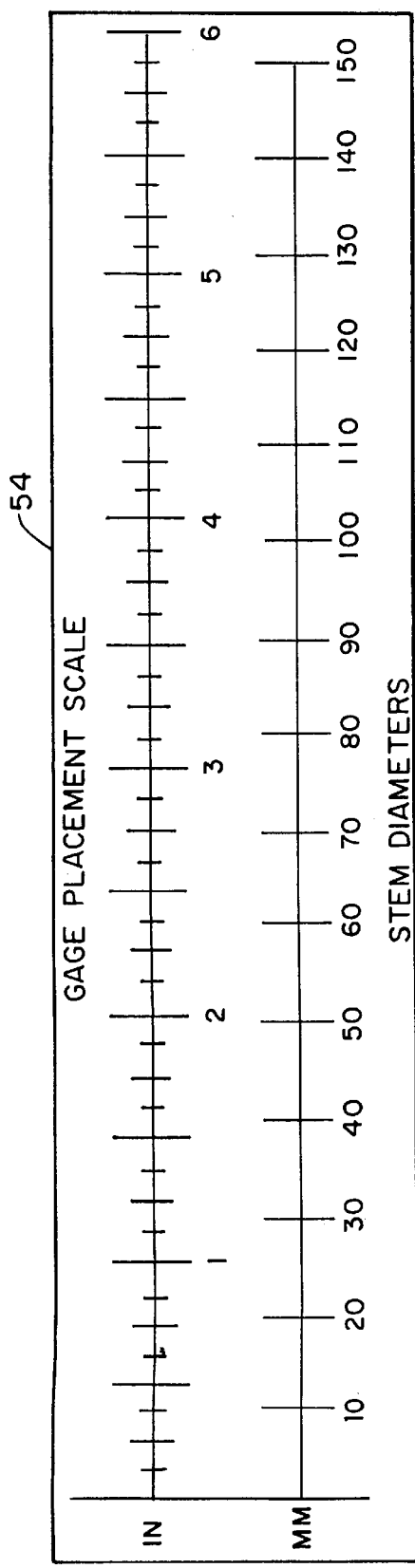
FIG. 10 is a top plan view of a template employed in accordance with the present invention for properly locating the strain gage assemblies of FIG. 9 at predetermined aligned positions on a cylindrical member.

FIG. 10 shows a template 54 of a type which may be employed to facilitate precise alignment of the holders 10 on opposite sides of a cylindrical member. The template 54 is pi/2 times a standard inch and a standard millimeter scale. Proper alignment of the holders 10 is attained by measuring or otherwise obtaining the diameter of the cylindrical member at the desired measuring location and, using the template 54, separating the holders so that they are on opposite sides of the cylindrical member by aligning the same reference point on each holder (i.e., the left edges on each holder, the right edges on each holder, etc.) to the appropriate reference mark on the template.

Figure 11:
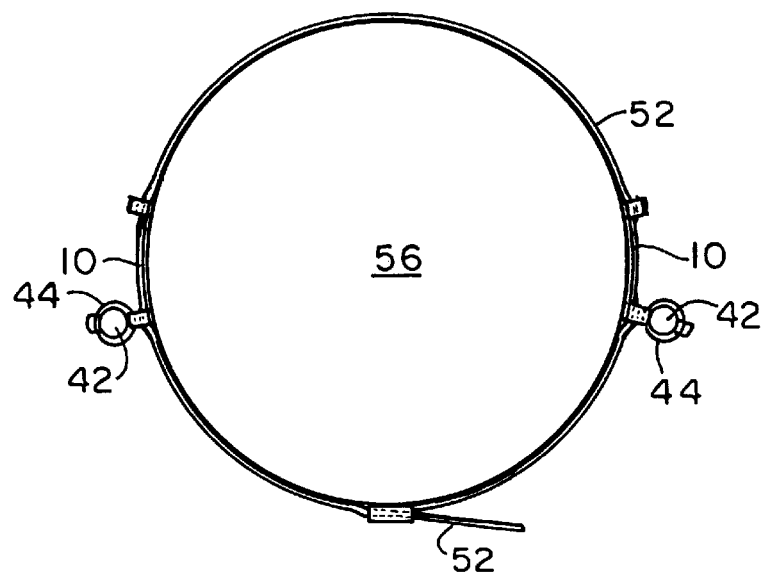
FIG. 11 is a top plan view of a cylindrical member with the strain gage assemblies of FIG. 9 secured thereto.

Preferably, prior to installation, the surfaces of the cylindrical member 56 (FIG. 11) where the holders 10 are to be attached are roughed up utilizing a suitable abrasive materials such as 400 grit sandpaper to provide roughened areas of about twice the area of the substrates 30. The roughened areas are also preferably thoroughly cleaned utilizing a suitable cleaning agent to remove any grease or other deposits from the roughened areas. A bonding agent is employed for the actual securing of the substrates 30 to the cylindrical member 56. Preferably, chemical depassivation is employed on the second surface 30b of the substrate 30 prior to installation. Alternatively, depassivation treatment can be employed when the substrate is formed and a protective member such as mylar film can be provided on the second substrate surface 30b and removed just prior to bonding. In the presently preferred embodiment, the boding agent comprises a nuclear grade titanium putty since it has been found that the titanium putty provides good quality bonding and adequate transfer of strain from the cylindrical member 56 to the substrates 30. Titanium putty of the type employed in the present embodiment is well known to those of ordinary skill in the art and is available from a variety of manufacturers. It will be appreciated by those of ordinary skill in the art that while titanium putty is the preferred bonding agent, any other suitable bonding agent such as some other type of resin-based adhesive, epoxy or the like may alternatively be employed.

In the present embodiment, the titanium putty is suitably mixed or otherwise prepared and a thin layer is applied to the roughened, cleaned area of the cylindrical member 56 and to the second surface 30b of the substrate. The holders 10 are then aligned in the predetermined measured positions and the tie wrap 52 is pulled tight to secure and retain the holders 10 and thus the substrates 30 in the predetermined aligned positions on the cylindrical member 56. Preferably, a mechanical tightening device (not shown) of the type well known in the tie wrap art is employed for making sure that the tie wrap 52 is tight enough to provide pressure over the entire length of the holder 10 and on the substrate 30 to ensure proper bonding of the substrate 30 to the underlying cylindrical member 56 over the entire area of the substrate 30. The tie wrap 52 should be retained in place at least long enough to permit the bonding agent to properly cure after which the tie wrap 52 may be removed, if desired. Alternatively, the tie wrap 52 may remain in place for a longer period of time, if desired.

Figure 12:
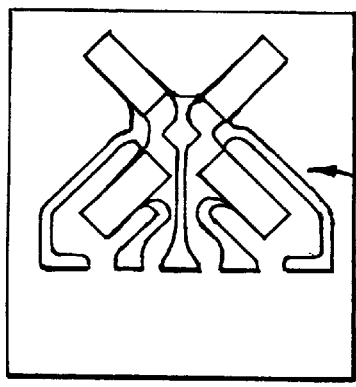
FIG. 12 is a front elevational view of an alternate strain gage substrate with strain gages thereon.

FIG. 12 is a front elevational view of an alternative strain gaged substrate 130 which may be employed in connection with the present invention particularly when only torque measurement is required. The alternative gaged substrate 130 includes gage elements 132 which are, themselves, arranged in a pattern optimized to cancel out bending without the need for an alternate strain gage substrate on the opposite sides of a cylindrical member. The strain gage elements 132 are formed as a full active arm bridge configuration in which adjacent arms sense like (cancellatory) strain contributions from bending (and thrust), and sense like, but opposing (non-cancellatory) strain contributions from torque. The alternate strain gaged substrate 130 is secured to a single holder 10 (not shown) and the holder 10 and strain gaged substrate 130 are secured to a cylindrical member in the same manner as described above. However, with the alternate strain gaged substrate 130, only a single holder 10 and strain gaged substrate 130 are employed.

From the foregoing description, it can be seen that the present invention comprises a practical way of applying properly aligned opposing elements of a strain gage bridge on a valve stem, shaft or other cylindrical member of virtually any size or diameter. All intra-bridge connections are pre-wired so that contact resistance does not adversely affect strain measurements and any bending effects are canceled. It will be appreciated to those skilled in the art that changes or modifications could be made to the above-described embodiments without departing from the broad inventive concepts of the invention. It should be appreciated, therefore, that the present invention is not limited to the particular embodiments disclosed, but is intended to cover all embodiments within the scope or spirit of the invention as set forth in the appended claims.

I claim:

1. A device for measuring strain parameters of a generally cylindrical member of virtually any size, the device comprising:
   a pair of generally flexible holders, each holder supporting a substrate having at least one strain gage thereon, each substrate being bonded in a pre-determined aligned position on the cylindrical member relative to the other substrate to permit strain measurement of the cylindrical member, the holders each including at least one guide; and
   a flexible tensioning band engaging the guide on each of the holders for placement and retention of the substrates in the pre-determined positions, the band being tightened to provide pressure on the substrates at least during bonding for proper bonding of the substrates to the cylindrical member to provide adequate transfer of strain.

2. The device as recited in claim 1, wherein the flexible tensioning band comprises a polymeric tie wrap member.

3. The device as recited in claim 2, wherein each holder is comprised of a generally flat, generally rectangularly shaped member.

4. The device as recited in claim 3, wherein each holder has first and second oppositely disposed major surfaces and first and second opposite ends and wherein the guide comprises a pair of generally U-shaped members extending outwardly from the second surface of each holder proximate each of the ends to establish a pair of aligned openings for receiving the tie wrap member.

5. The device as recited in claim 4, wherein the tie wrap member has a pre-determined width and wherein each of the aligned openings has a pre-determined width generally corresponding to the width of the tie wrap member to facilitate insertion of the tie wrap member through each of the loops with a tight fit.

6. The device as recited in claim 5, wherein each substrate is secured to the first surface of a respective holder.

7. The device as recited in claim 6, wherein the holders are formed of a polymeric material.

8. The device as recited in claim 1, wherein each substrate includes at least three strain gages thereon, the strain gages being arranged in a pre-determined pattern.

9. The device as recited in claim 1, wherein the substrate is comprised of BeCu.

10. The device as recited in claim 1, wherein the substrates are bonded on opposite sides of the cylindrical member to permit the cancellation of bending effects.

11. A device for measuring strain parameters of a generally cylindrical member of virtually any size, the device comprising:
    a generally flexible holder supporting a substrate having at least one strain gage thereon, the substrate being bonded in a predetermined position on the cylindrical member to permit strain measurement of the cylindrical member, the holder including at least one guide; and
    a flexible tensioning band engaging the guide on the holder for placement and retention of the substrate in the predetermined position, the band being tightened to provide pressure on the substrate during bonding for proper bonding of the substrate to the cylindrical member to provide adequate transfer of strain.

12. The device as recited in claim 11 wherein the flexible tensioning band comprises a polymeric tie wrap member.

13. The device as recited in claim 12 wherein the holder is comprised of a generally flat, generally rectangularly shaped member.

14. The device as recited in claim 13 wherein the holder has first and second oppositely disposed major surfaces and first and second opposite ends and wherein the guide comprises a pair of generally rectangularly-shaped loops extending outwardly from the second surface of the holder proximate to each of the ends.

15. The device as recited in claim 14 wherein the tie wrap member has a predetermined width and wherein each of the loops of the holder has a predetermined width generally corresponding to the width of the tie wrap member to facilitate insertion of the tie wrap member through each of the loops with a tight fit.

16. The device as recited in claim 15 wherein the holder is formed of a polymeric material.

* * * * *